H. W. SPANG.
LIGHTNING ROD.
No. 9,934. Reissued Nov. 15, 1881.
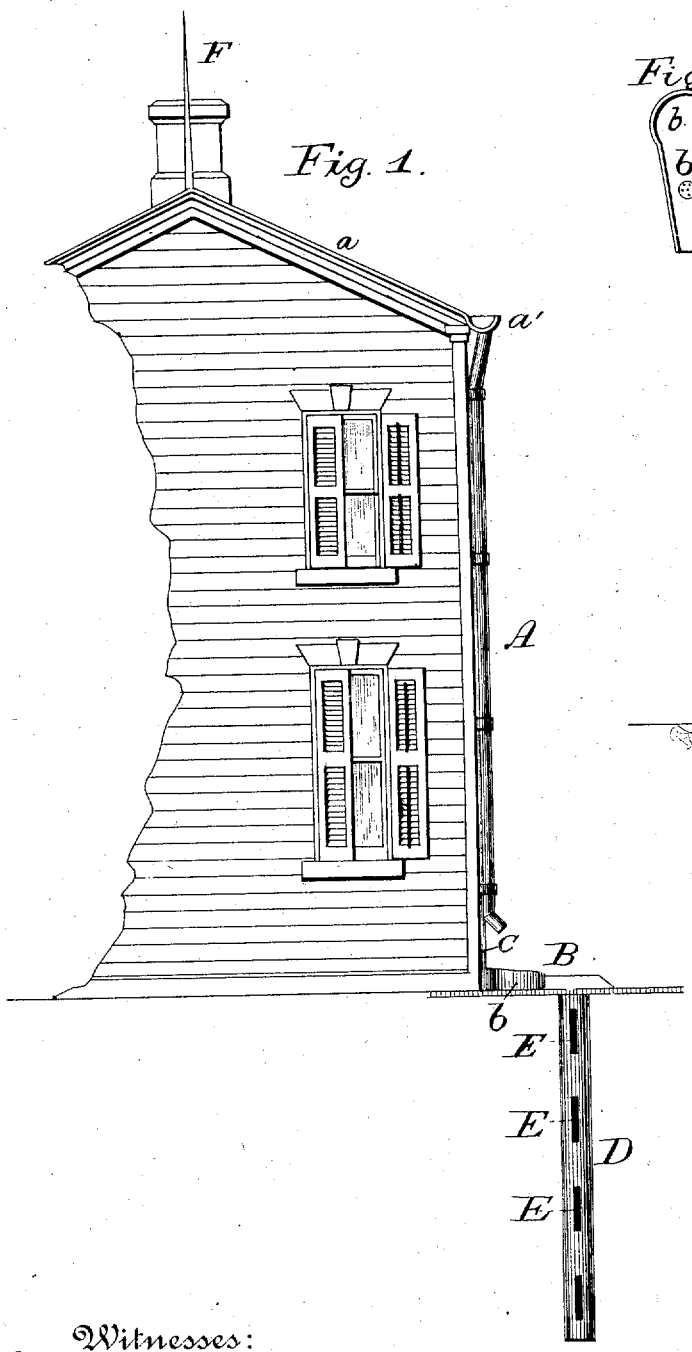
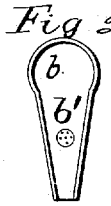
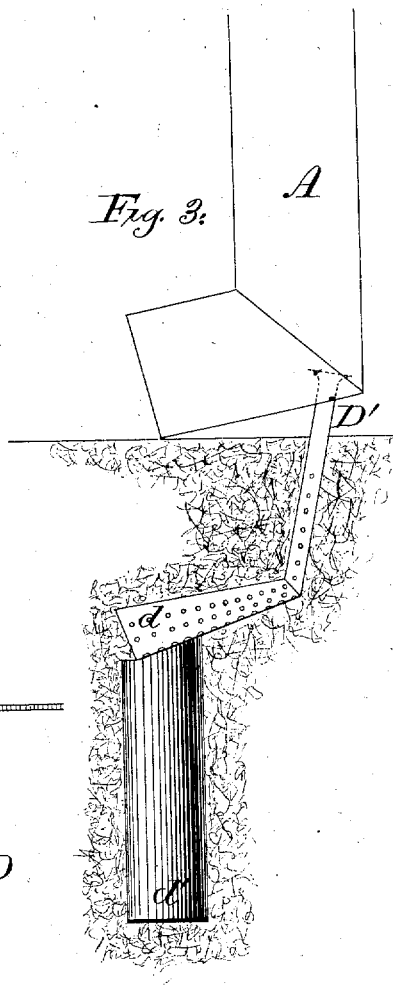
Witnesses:
Mrs. K. C. French
Millet C. Earl
Inventor:
Henry W. Spang,
by his Attorney,
Frank L. Pope

UNITED STATES PATENT OFFICE.

HENRY W. SPANG, OF READING, PENNSYLVANIA.

LIGHTNING-ROD.

SPECIFICATION forming part of Reissued Letters Patent No. 9,934, dated November 15, 1881.

Original No. 167,415, dated September 7, 1875 : Reissue No. 6,835, dated January 4, 1876. Application for reissue filed July 14, 1881.

*To all whom it may concern:*

Be it known that I, HENRY W. SPANG, a citizen of the United States, residing at Reading, in the county of Berks and State of Pennsylvania, have invented certain new and useful Improvements in Lightning-Conductors, of which the following is a specification.

This invention consists in connecting an ordinary metallic rain-pipe of a house or other structure with a metallic roof or other lightning attractor or conductor at its top, and with a perforated or slitted metallic pipe inserted into the earth near its bottom or foot, so as to form a continuous line of electrical conductors, and at the same time to keep the earth surrounding the said perforated pipe, and any other terminal metallic conductor connected therewith, moist by means of rain or waste water, and thereby secure a good earth-connection therefor; and, also, to afford means whereby, during a thunder-storm, a portion of the attracted electricity will be diffused through the flowing rain-water and into the moist surface of the earth, the said metallic rain-pipe being connected with the perforated earth-pipe by means of a metallic drain, gutter, or conduit, or directly therewith, if preferred.

It also consists in an improved earth-terminal for lightning conductors or rods, consisting of a metallic pipe having perforations or openings along its entire length or sides, so that the rain or waste water which enters the pipe will not only flow into and permeate the earth at the bottom, but also along the whole length of the pipe on every side, thereby causing a great mass of the earth to be quickly saturated with water, and enabling dangerous accumulations of lightning or atmospheric electricty to be more readily diffused than by any other method, device, or devices heretofore employed for moistening the earth surrounding the terminal conductor and for diffusing lightning.

The details of construction involved in my invention, and the operation thereof, will be fully explained in the following specification with reference to the accompanying drawings, in which—

Figure 1 is a view, in elevation, of my invention. Fig. 2 is a plan view of a metallic drain, gutter, or conduit. Fig. 3 shows a modification of my invention.

A is an ordinary metallic rain-pipe, connected with and leading from the metallic roof *a* of a house, at the gutter or trough *a'* thereof.

B is a metallic drain, gutter, or conduit, the basin *b* of which receives the rain or waste water flowing through and from pipe A. This conduit is connected to pipe A by a metallic rod, pipe, or other suitable electric conductor, C.

Near the mouth of the gutter, and in the bottom thereof, is an aperture, *b'*, at which a metallic pipe, D, having an opening at its top and bottom, and any suitable number of openings or perforations, E, of any desired form or size along its entire length or sides, is connected to the conduit B, and extends downward into the earth.

The aperture *b'* in the bottom of the conduit B may be covered by a perforated disk in summer, which perforated disk will allow the passage of water into pipe D, but prevent the passage of trash, by which the pipe might become clogged. In the winter the perforated disk may be replaced by a solid one, so as to prevent the water from entering pipe D and freezing, as at that season the earth is usually sufficiently moist, and lightning is of rare occurrence.

When the house has a metallic roof, as shown at *a* in the drawings, and the pipe A is connected therewith, an attracting-rod, F, which extends above the top of the chimney or other elevated projection of the house, should be erected directly upon the roof and be metallically connected therewith; but in case the house has a wooden, slate, or other roof of poor conducting material, the lightning attractor or conductor F must be connected with the rain-pipe A, or with the metallic eaves-trough or gutter to which said pipe A is connected.

The drain, gutter, or conduit B, for conveying the water from rain-pipe A into the perforated pipe D, may be of any desired length, and may, if desired, extend into the street-gutter, or into a sewer, and the perforated-pipe D may be extended from any portion of the said drain, gutter, or conduit. A gutter or drain, B, may also be so arranged that the waste water from a pump or hydrant, or from a gutter or stream, will also flow into the said perforated pipe D and keep the earth about said pipe well moistened during dry weather.

The pipe D may be round, square, or of any desired form, and may also have any number of perforated branches; it may also be provided with an enlargement at its bottom or top, so as to hold a large quantity of water during a thunder-storm; and it may also have other metallic terminal conductors connected therewith.

Instead of employing a solid pipe, D, round, square, or of any other suitable form, perforated with openings or holes, as hereinbefore described, several pieces or bars of metal may be used, and these may be fitted and held together at the top and bottom by means of metal hoops or other suitable fastenings, so that there will be a suitable space or opening between each pair of said pieces or bars, which will allow the water to pass through and moisten the earth surrounding and beneath them, and thereby answer the same purpose as a solid perforated pipe, while it will be more convenient to handle them in placing the earth-terminal in a hole made by a driving-rod, earth-auger, or excavator.

In the modification shown in Fig. 3 the perforated pipe D′ connects above ground directly with the metallic rain-pipe A, which is supposed to be in metallic connection with a lightning attractor or conductor at its top, and it has a perforated funnel or enlargement, *d*, connected therewith by an elbow-joint at the foot thereof, so as to hold a large quantity of water, and a terminal metallic plate, *d′*, is connected to and extends vertically downward from the perforated funnel or enlargement *d*, as shown. In this arrangement the perforated pipe D′ is supplied with water directly from rain-pipe A, and the gutter or drain or conduit is dispensed with. I prefer, however, to make use of the gutter or drain B, as it affords a better path for discharging the attracted lightning over and into the moist surface of the earth through the flowing rain-water discharged therefrom during a thunder-storm.

It is well known that in order to cause lightning to be readily diffused into the earth, and to secure the proper action of lightning-conductors, it is necessary that the said conductor should terminate in, or at least come in contact with, a large and well-moistened mass of the earth. Dry earth is a poor conductor, into which atmospheric electricity does not readily flow from the terminal conductor of a metallic rod, pipe, or other lightning-conductor erected upon a house, and when said conductor does not have a sufficient mass or reservoir of well-moistened earth into which to freely and readily discharge its attracted electricity it becomes worthless as a protection, as the electricity is liable in such case to leave the conductor, pass into the building, and damage or destroy it, as well as endanger the lives of the inmates. The object, therefore, of employing the perforated pipe D and extending it downward into the earth in the manner shown is that a portion of the rain or waste water may flow into the pipe D and moisten the mass of earth surrounding and beneath said pipe, and thereby provide a suitable reservoir of moist earth, and particularly during a thunder-storm, for the diffusion of lightning into the earth. I carry the pipe D to a distance below the surface of the earth where there is approximately permanent moisture; but as the depth to which the heat of the sun dries the earth varies during the summer I aim to have my pipe or terminal conductor so placed that, if not actually within the line of permanent moisture, communication therewith will be very soon established after the commencement of a thunder-storm by means of the rain-water flowing through the lower opening and perforations of pipe D. Water is a good conductor of atmospheric electricity, and during a thunder-storm the greater portion of the rain-water flowing from rain-pipe A passes over the drain or gutter or conduit B at the top of perforated pipe D and spreads over the surface of the earth, gutter, or pavement, and in the latter case reaches the earth through the interstices of the pavement, or flows into a running gutter or sewer. Hence the flowing rain-water assists in diffusing the attracted electricity from said drain or gutter B or pipe D or connecting-conductor over a large area of the moist surface of the earth, along the gutters, pavements, sewers, &c.

The gas-pipes in a building, or any other metallic conductor, may be used as part of the lightning-conductors in connection with perforated pipe D, and care should be taken that a good electrical connection is made between the joints of the gas-pipes by soldering or brazing them together, or by an additional conductor, as the red lead used at the joints of such pipes is a poor conductor of electricity; and the meter must also be shunted by means of a copper sheet or wire or other good conductor having greater conductivity than the material of the meter and the lead joints thereof, so as to prevent the meter from being damaged and the gas set on fire by the melting of the lead joints.

The pipe D, with perforations or openings E, as hereinbefore described, constitutes a much better medium for saturating the earth with water than an ordinary pipe with the usual openings at its opposite ends, or any of the devices heretofore employed for that purpose, for the reason that the water escaping from said pipe not only saturates the earth at the bottom of the pipe, but along its entire length and on every side of it, which is not accomplished by the ordinary pipe, or by any other device heretofore used. The said pipe D will more readily diffuse lightning and make a better earth-connection, for the reason that a large mass of well-moistened or saturated earth offers far less resistance to the passage of electricity than a small mass of partially-moist earth.

Having now fully described the construction and operation of my invention, I claim—

1. A perforated or slitted metallic pipe or tube constituting an earth-terminal of a lightning-conductor.

2. The combination, substantially as hereinbefore set forth, of a lightning-conductor, a conducting-terminal for the same extending into the earth, and an open conduit upon the surface of the earth for conveying and discharging flowing water upon said surface, all electrically connected together.

3. The combination, substantially as hereinbefore set forth, of a metallic rain-pipe and an earth-terminal consisting of a perforated or slitted metallic pipe electrically connected with said rain-pipe.

4. The combination, substantially as hereinbefore set forth, of a metallic roof or other electric conductor, a metallic rain-pipe, a metallic gutter for receiving the water from said rain-pipe, and a perforated or slitted metallic pipe capable of receiving water from said gutter, all of which are electrically connected to form a lightning-conductor.

5. The combination, substantially as hereinbefore set forth, of a metallic rain-pipe, a perforated or slitted metallic ground-pipe, and an interposed metallic conduit which receives the water from said rain-pipe and discharges it partly upon the surrounding earth and partly into said ground-pipe, all of which are electrically connected.

HENRY W. SPANG.

Witnesses:
DANL. SPANG,
ISAAC Y. SPANG.